(12) United States Patent
Browning (10) Patent No.: US 9,999,970 B2
(45) Date of Patent: Jun. 19, 2018

(54) TELESCOPING HANDLE DEVICE

(71) Applicant: Don Robert Browning, Salem, VA (US)

(72) Inventor: Don Robert Browning, Salem, VA (US)

(*) Notice: Subject to any disclaimer, the term of this patent is extended or adjusted under 35 U.S.C. 154(b) by 0 days. days.

(21) Appl. No.: 15/798,940

(22) Filed: Oct. 31, 2017

(65) Prior Publication Data

US 2018/0085911 A1    Mar. 29, 2018

Related U.S. Application Data

(63) Continuation-in-part of application No. 15/713,842, filed on Sep. 25, 2017.

(60) Provisional application No. 62/495,889, filed on Sep. 28, 2016.

(51) Int. Cl.
| | |
|---|---|
| *B66F 19/00* | (2006.01) |
| *B25G 1/04* | (2006.01) |
| *B25G 1/10* | (2006.01) |
| *B25J 1/04* | (2006.01) |
| *B61H 13/02* | (2006.01) |

(52) U.S. Cl.
CPC ............... *B25G 1/04* (2013.01); *B25G 1/102* (2013.01); *B25J 1/04* (2013.01); *B61H 13/02* (2013.01)

(58) Field of Classification Search
CPC .................................. B25G 1/04; B25G 1/102
USPC .............. 294/24, 26, 210; 15/144.4; 16/429; 81/177.2
See application file for complete search history.

(56) References Cited

U.S. PATENT DOCUMENTS

| | | |
|---|---|---|
| 5,481,950 A | 1/1996 | Browning |
| 6,182,539 B1 | 2/2001 | Webster |
| 6,202,519 B1 | 3/2001 | Yandt |
| 8,434,802 B2 | 5/2013 | Lofley et al. |
| 8,469,425 B1 | 6/2013 | Lofley et al. |
| 8,469,426 B2 | 6/2013 | Lofley et al. |
| 8,671,807 B2 | 3/2014 | Monroe |
| 8,857,030 B2 | 10/2014 | Stutson |
| 8,939,051 B1 | 1/2015 | Lofley et al. |

*Primary Examiner* — Paul T Chin (74) *Attorney, Agent, or Firm* — Patentfile, LLC; Bradley C Fach; Steven R Kick (57) ABSTRACT

A telescoping handle device may include an outer housing which may be slidably coupled to a shaft. The outer housing may have an elongated side wall, and the side wall may terminate in a first end and a second end. A cavity may be formed within the side wall, and the cavity may include a key channel and a lock groove. The shaft may be movable within the cavity, and the shaft may have an upper end and a lower end. A shaft key may be coupled to the shaft, and the shaft key may be slidably engaged within the key channel so that the shaft key is slidable between the first end and the second end. The shaft key may be rotatable out of the key channel and into the lock groove to prevent the shaft key from being slidable between the first end and the second end.

20 Claims, 8 Drawing Sheets

TELESCOPING HANDLE DEVICE

CROSS REFERENCE TO RELATED APPLICATIONS

This application is a continuation-in-part of U.S. Non-Provisional application Ser. No. 15/716,842, filed on Sep. 25, 2017, entitled "LOCKING SYSTEM FOR TELESCOPING HANDLE ASSEMBLY", which claims priority to and the benefit of U.S. Provisional Patent Application No. 62/495,889 filed on Sep. 28, 2016, entitled "LOCKING SYSTEM FOR TELESCOPING HANDLE ASSEMBLY", the entire disclosures of which are incorporated by reference herein.

FIELD OF THE INVENTION

This patent specification relates to the field of telescoping handle assemblies. More specifically, this patent specification relates to a locking mechanism for a telescoping handle assembly for tools.

BACKGROUND

Railroad employees use a multipurpose tool (See U.S. Pat. No. 5,481,950) commonly referred to as a brakestick to operate handbrakes on railroad cars from the ground. The tool consists of a sliding or telescoping handle assembly, a locking mechanism to hold the sliding sections of the assembly in place and a specially designed hook for engaging the railroad car brake wheel. Use of the tool prevents injuries related to climbing on railroad cars to operate handbrake wheels as well as injuries resulting from operating the brake wheel itself. The tool enhances both safety and productivity.

The brakestick can experience significant tension when pulled on by the user to tighten or loosen brake wheels. The design of past and current locking systems of the brakestick have resulted in the inner rod of the brakestick handle breaking, the inner rod being pulled out of the outer tube, jamming of the locking mechanism, and the locking mechanism failing to securely hold the inner rod in place after the inner rod has been locked in the desired position.

The most popular locking system uses a mechanical device to grip lateral grooves cut into the inner rod. The grooves weaken the structural integrity of the inner rod which has resulted in the rod breaking when the brakestick is in use (See U.S. Pat. No. 6,182,539). Other locking systems use internal camlocks, spring loaded ball plungers, or other mechanical devices to secure the inner rod. Each of which have proven difficult to operate or inadequate to hold the inner rod in place.

Therefore a need exists for a novel telescoping handle assemblies. A further need exists for novel locking mechanism for telescoping handle assemblies for tools, such as which may be for use with a railroad car. There is also a need for novel telescoping handle assemblies having a simple and robust design that eliminates all the aforementioned problems that have been experienced with previous locking systems.

BRIEF SUMMARY OF THE INVENTION

A telescoping handle device is provided which includes a novel locking mechanism for telescoping handle assemblies for tools, such as which may be for use with railroad cars. In some embodiments, the device may include an outer housing which may be slidably coupled to a shaft. The outer housing may have an elongated side wall, and the side wall may terminate in a first end and a second end. A cavity may be formed within the side wall, and the cavity may include a key channel and a lock groove. The shaft may be movable within the cavity, and the shaft may have an upper end and a lower end. A shaft key may be coupled to the shaft, and the shaft key may be slidably engaged within the key channel so that the shaft key is slidable between the first end and the second end. The shaft key may be rotatable out of the key channel and into the lock groove to prevent the shaft key from being slidable between the first end and the second end.

In further embodiments, the device may include a collar which may be rotatably coupled to the first end of the outer housing. The collar may have a collar aperture for slidably receiving portions of the shaft, and the collar may be rotationally coupled with the shaft.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Figure 1:
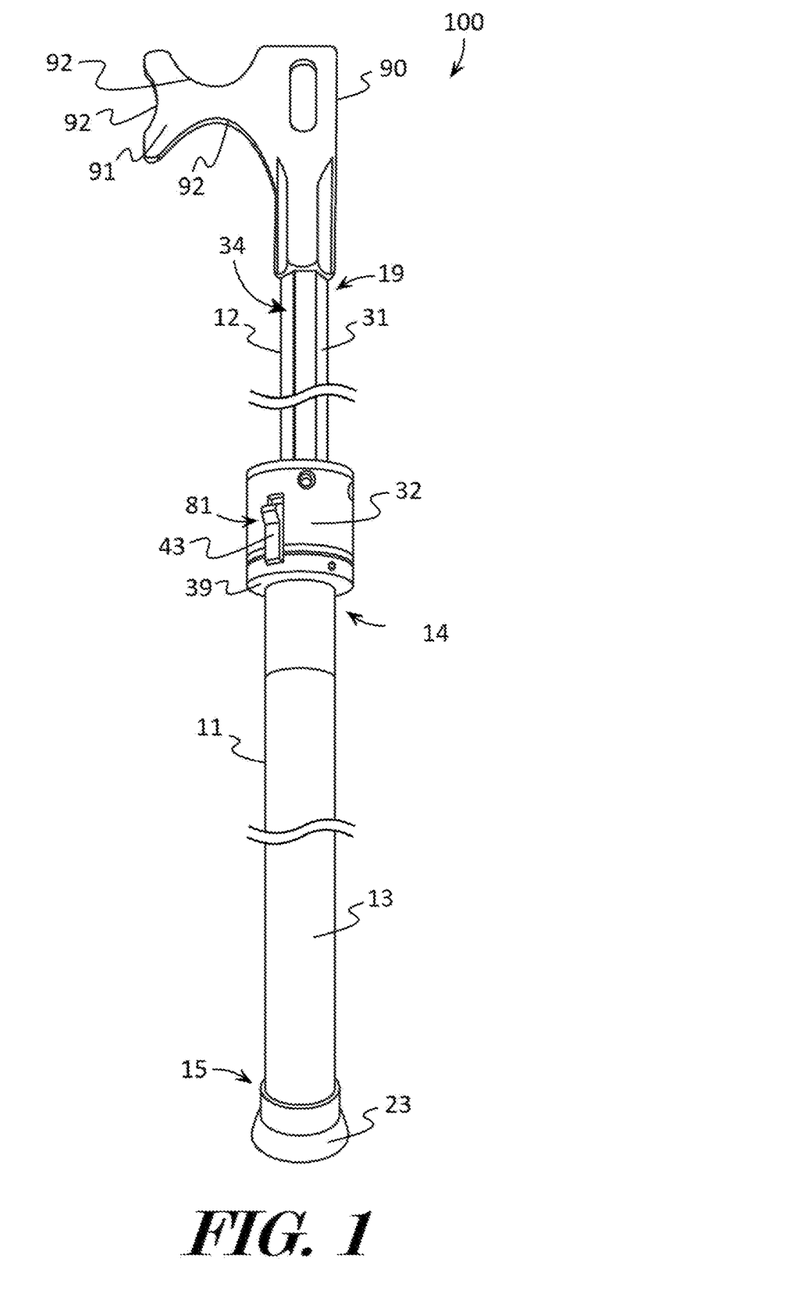
FIG. 1 depicts a perspective view of an example of a telescoping handle device having a lever in a first position according to various embodiments described herein.
Figure 2:
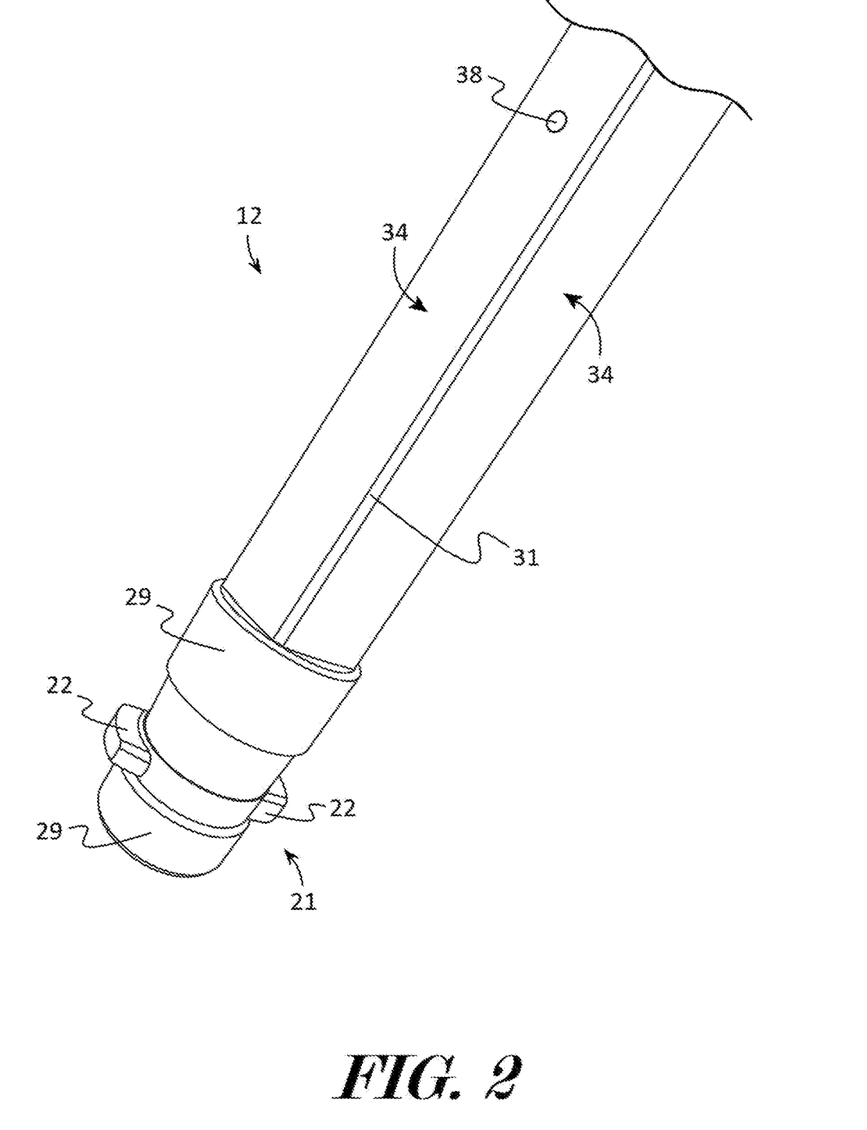
FIG. 2 illustrates a perspective view of an example of a lower end of a shaft according to various embodiments described herein.

For purposes of description herein, the terms "upper", "lower", "left", "right", "rear", "front", "side", "vertical", "horizontal", and derivatives thereof shall relate to the invention as oriented in FIG. 1. However, one will understand that the invention may assume various alternative orientations and step sequences, except where expressly specified to the contrary. Therefore, the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Although the terms "first", "second", etc. are used herein to describe various elements, these elements should not be limited by these terms. These terms are only used to distinguish one element from another element. For example, the first element may be designated as the second element, and the second element may be likewise designated as the first element without departing from the scope of the invention.

As used in this application, the term "about" or "approximately" refers to a range of values within plus or minus 10% of the specified number. Additionally, as used in this application, the term "substantially" means that the actual value is within about 10% of the actual desired value, particularly within about 5% of the actual desired value and especially within about 1% of the actual desired value of any variable, element or limit set forth herein.

New telescoping handle device for tools, such as which may be for use with a railroad car, are discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

The present invention will now be described by example and through referencing the appended figures representing preferred and alternative embodiments. FIG. 1 illustrates an example of a telescoping handle device ("the device") 100 according to various embodiments. In some embodiments, the device 100 may comprise an outer housing 11 which may be slidably coupled to a shaft 12. The outer housing 11 may comprise an elongated side wall 13, and the side wall 13 may terminate in a first end 14 and a second end 15. A cavity 16 may be formed within the side wall 13, and the cavity 16 may comprise a key channel 17 and a lock groove 18. The shaft 12 may be movable within the cavity 16, and the shaft 12 may have an upper end 19 and a lower end 21. A shaft key 22 may be coupled to the shaft 12, and the shaft key 22 may be slidably engaged within the key channel 17 so that the shaft key 22 is slidable between the first end 14 and the second end 15. The shaft key 22 may be rotatable out of the key channel 17 and into the lock groove 18 to prevent the shaft key 22 from being slidable between the first end 14 and the second end 15.

The housing 11 may comprise a side wall 13 which may be elongated so as to have a length substantially longer than its width and height. In some embodiments, the side wall 13 may comprise an elongated generally cylindrical shape, while in other embodiments; the side wall 13 may comprise an elongated generally triangular prism shape, an elongated rectangular prism shape, or any other elongated shape including combinations of shapes. The side wall 13 and any other element of the outer housing 11 may be made from or comprise steel alloys, preferably aluminum or aluminum alloys, copper alloys, any other type of metal or metal alloy, various types of hard plastics, such as polyethylene (PE), Ultra-high-molecular-weight polyethylene (UHMWPE, UHMW), polypropylene (PP) and polyvinyl chloride (PVC), polycarbonate, nylon, Poly(methyl methacrylate) (PMMA) also known as acrylic, melamine, hard rubbers, fiberglass, carbon fiber, resins, such as epoxy resin, wood, other plant based materials, or any other material including combinations of materials that are substantially rigid.

In some embodiments, all or portions of the exterior surface 20 of a side wall 13 may comprise or be covered in a cushioning material or grip enhancing material. Example cushioning materials may include silicone foams, rubber foams, urethane foams including plastic foams, neoprene foam, latex foam rubber, polyurethane foam rubber, or elastomer materials such as elastic plastics, elastic silicone, elastic rubbers, or any other suitable elastomer or resilient material including combinations of materials. Example grip enhancing materials may include resilient materials, such as textured rubber and textured plastic, and substantially rigid materials, such as textured aluminum or other textured metals and metal alloys. In further embodiments, a sleeve of rigid material, such as aluminum, preferably having a knurled texture, may extend over all or portions of the exterior surface 20 of the side wall 13 to provide a covering for one or more lock grooves 18 cut through the side wall 13 and to provide enhanced lateral strength and/or further structural rigidity to the outer housing 11.

The outer housing 11 may comprise a cavity 16 into which portions of the shaft 12 may be retracted into and extended from. In some embodiments, the cavity 16 may be formed within the side wall 13 and preferably all or portions of the cavity 16 may be formed or bounded by the side wall 13 or by one or more side wall interior surfaces 25. The cavity 16 preferably may be elongated and extend from the first end 14 towards the second end 15 of the outer housing 11. In further embodiments, the cavity 16 may extend the entire length of the side wall 13, and the second end 15 may comprise a cap 23 or other covering which may close off the cavity 16 at the second end 15.

In some embodiments, the device 100 may comprise one or more key channels 17 which may be coupled to the side wall 13 or other element of the outer housing 11 so that the key channels 17 are disposed within the cavity 16. In this manner, the cavity 16 may comprise one or more key channels 17 which may form and bound portions of the cavity 16. Preferably, a key channel 17 may be formed by a portion of a side wall interior surface 25 that is between two key channel surfaces 26. A key channel surface 26 may be formed on a portion of a land 24 and/or a key channel surface 26 may be formed on a portion of a rail 27. A key channel 17 may be elongated and extend all or portions of the length of the cavity 16. Preferably, a key channel 17 may be orientated generally parallel with the first end 14 and second end 15 of the outer housing 11. In some embodiments, a key channel 17 may be formed or cut into the side wall 13 or other element of the outer housing 11. A key channel 17 may be bounded at the first end 14 by portions of a collar 32, ring 39, or other elements of the device 100. A key channel 17 may be bounded at the second end 15 by a cap 23 or other covering which may close off the cavity 16 at the second end 15 or by one or more pins, fasteners, or other objects inserted through or coupled to the side wall 13 which may block a shaft key 22 or other element of the shaft 12 from exiting the second end 15.

Generally, a key channel 17 may be configured with a width that is larger, and preferably slightly larger, than the width of a shaft key 22 so that the longitudinal movement (movement between the first end 14 and the second end 15) of the shaft key 22 within the cavity 16 may be guided and controlled by the key channel 17 to limit or prevent the shaft key 22 from rotating within the cavity 16. For example, a shaft key may comprise a width (W1) of approximately 0.50 inches and a key channel may comprise a width of approximately 0.510 inches. Optionally, a key channel 17 may be formed or bounded by one or more lands 24 which may comprise one or more, such as a plurality, of projections which may extend away from the side wall 16. While in a key channel 17, the longitudinal movement of the shaft key 22 within the cavity 16 may be guided and controlled by side wall interior surfaces 25 and a key channel surface 26 of the key channel 17.

In some embodiments, the device 100 may comprise one or more rails 27 which may be coupled to the side wall 13 or other element of the outer housing 11 so that the rails 27 are disposed within the cavity 16. In this manner, the cavity 16 may comprise one or more rails 27 which may form and bound portions of the cavity 16. A rail 27 may comprise a rail surface 28 which may contact and guide the longitudinal movement of portions of the shaft 12, such as one or more bushings 29 which may be coupled to the shaft body 31. Generally, a rail 27 may be configured with a width that is approximately equal to the width of a shaft key 22. However, a rail 27 may be configured in any shape or size.

In some embodiments, a rail 27 may be elongated and extend approximately the length of the cavity 16 with one or more lock grooves 18 disposed in the rail 27 or separating sequential sections of a rail 27. In other embodiments, a rail 27 may be relatively short in length with one or more sections of the rail 27 positioned on preferably both sides (longitudinally) of a lock groove 18. For example, the cavity 16 may comprise a length of four feet and may comprise three lock grooves 18 positioned in a rail 27 having six sections with each lock groove 18 longitudinally bounded by two sections of the rail 27 each having a length of two inches. However, it should be understood that a rail 27 and any sections of the rail 27 may comprise any length.

The elements of the outer housing 11, such as the side wall 13, cavity 16, key channel 17, rail 27, etc., may be manufactured or formed with any suitable manufacturing technique. For example, the outer housing 11 may be made of extruded or machined aluminum or other durable material semi-circle halves of a certain length welded together longitudinally to form a cylindrical side wall 13 of a desired length with the key channels 17 and rails 27 extruded or formed, machined, or otherwise coupled within the cavity 16.

In some embodiments, the device 100 may comprise one or more relief channels 34 which may comprise any shape and size. Preferably, a relief channel 34 may extend longitudinally through the cavity 16. Optionally, a relief channel 34 may run the full length of the cavity 17 and may serve the purpose of removing material from the extruded or machined side wall 13 to achieve a reduction in weight. Optionally, a relief channel 34 may be formed into an extruded outer housing, machined into an outer housing, or otherwise formed into the outer housing 11.

The device 100 may comprise one or more lock grooves 18. In some embodiments, a lock groove 18 may be disposed within the cavity 16 and formed into a rail 27 or formed between two longitudinally adjacent sections of a rail 27. In preferred embodiments, a lock groove 18 may be orientated generally perpendicular to the one or more key channels 17 of the outer housing 11. Generally, a lock groove 18 may be shaped to receive all or portions of a shaft key 22 when all or portions of the shaft key 22 is rotated out of a key channel 17 and into the lock groove 18. In preferred embodiments, a rail 27 may comprise a width approximately equal to the width of a shaft key 22 and a lock groove 18 may be formed into the rail 27 so that the lock groove 18 may comprise a width approximately equal to the width of a shaft key 22. In further preferred embodiments, a lock groove 18 may comprise a height approximately equal to the width of a shaft key 22 so that when all or portions of the shaft key 22 is rotated out of a key channel 17 and into the lock groove 18, the longitudinal movement of the shaft key 22 in the lock groove 18 may be minimal.

Figure 3:
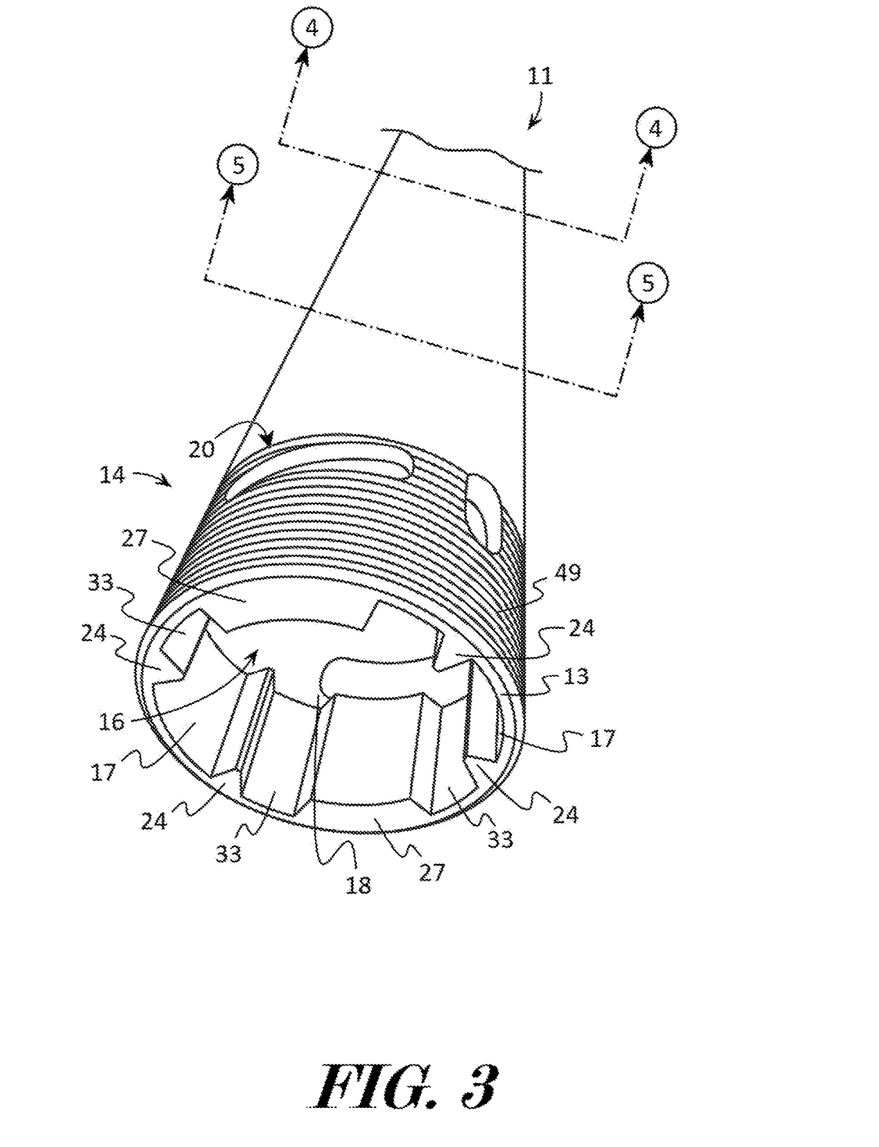
FIG. 3 shows a perspective view of an example of a first end of an outer housing according to various embodiments described herein
Figure 4:
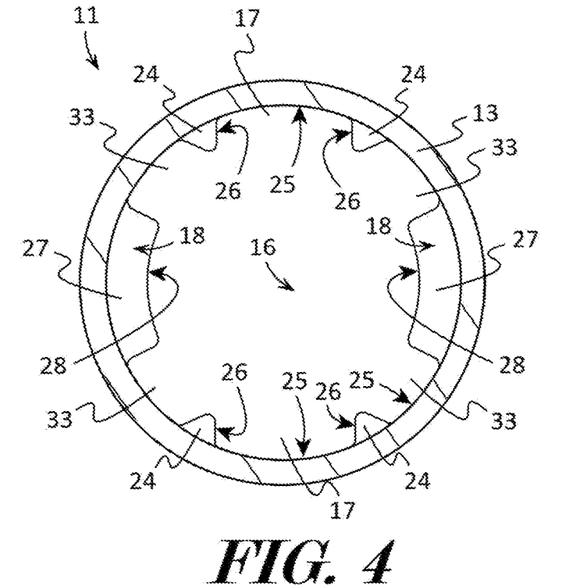
FIG. 4 depicts a sectional, through line 4-4 shown in FIG. 3, elevation view of an example of an outer housing sectioned through the lock grooves according to various embodiments described herein.
Figure 5:
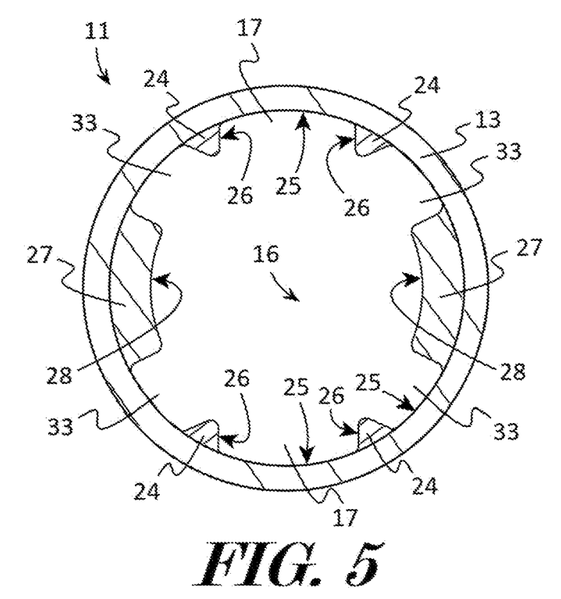
FIG. 5 illustrates a sectional, through line 5-5 shown in FIG. 3, elevation view of an example of an outer housing according to various embodiments described herein.
Figure 6:
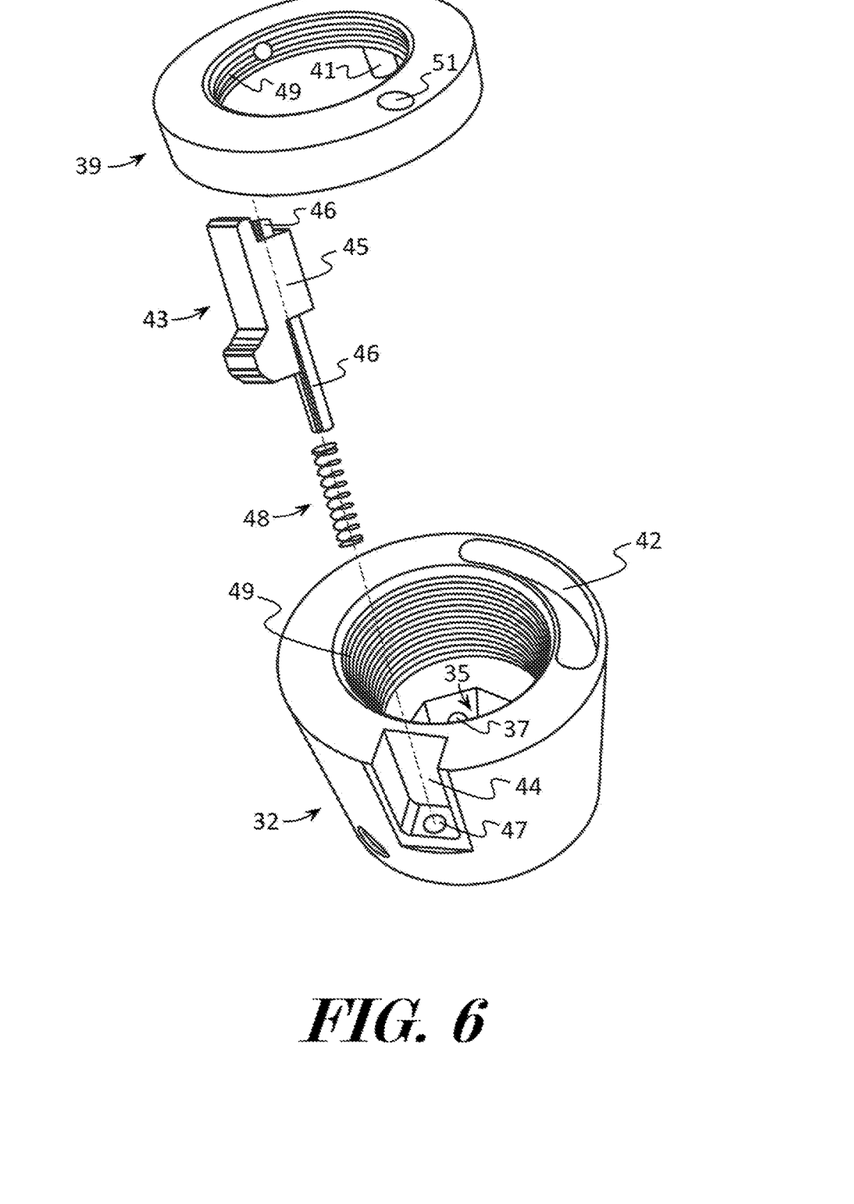
FIG. 6 shows a bottom perspective exploded view of an example of a collar and a ring according to various embodiments described herein.
Figure 7:
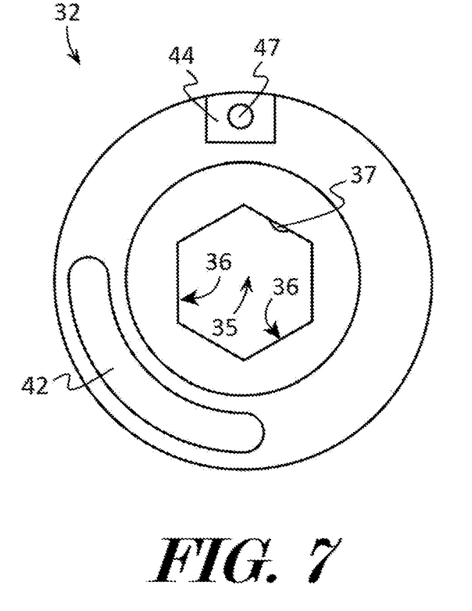
FIG. 7 depicts a top plan view of an example of a collar according to various embodiments described herein.
Figure 8:
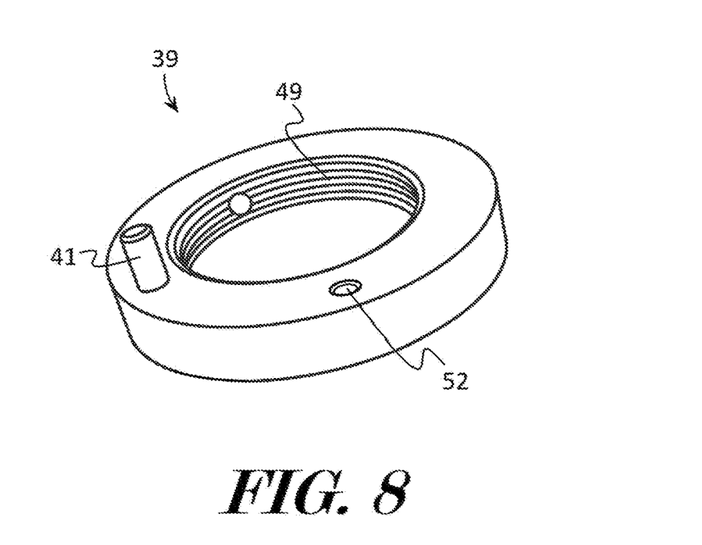
FIG. 8 illustrates a top perspective view of an example of a ring according to various embodiments described herein.

A lock groove 18 may be formed into the device 100 with any suitable method. In some embodiments, a side wall 13 having a rail 27 may be extruded or machined and a lock groove 18 may be formed by removing material from the rail 27 so that the rail 27 is divided into two sections. In other embodiments, a lock groove 18 may be formed by removing material from the side wall 13 and from a rail 27 so that the lock groove 18 may extend through the side wall 13 and rail 27 (as shown in FIG. 3), and portions of the lock groove 18 on the exterior surface 20 of the side wall 13 may be covered with a material, such as a cushioning material or grip enhancing material, to prevent user contact with the lock groove 18 or dirt and other contaminants from entering the cavity 16 via the lock groove 18.

The device 100 may comprise a shaft 12 having a shaft body 31, and all or portions of the shaft body 31 may be extendable from and retractable into the cavity 16 of the outer housing 11. The shaft body 31 may comprise any shape, and preferably an elongated shape, having a length substantially greater than its width and height. The shaft 12 may comprise one or more shaft keys 22 which may preferably be coupled to the shaft body 31 at or proximate to the lower end 21. Optionally, one or more tool heads 90 which may be configured to perform various functions may preferably be coupled to the shaft body 31 at or proximate to the upper end 19. The shaft body 31 and any other element of the shaft 12 may be formed from or comprise steel alloys, preferably aluminum or aluminum alloys, copper alloys, any other type of metal or metal alloy, various types of hard plastics, such as polyethylene (PE), Ultra-high-molecular-weight polyethylene (UHMWPE, UHMW), polypropylene (PP) and polyvinyl chloride (PVC), polycarbonate, nylon, Poly(methyl methacrylate) (PMMA) also known as acrylic, melamine, hard rubbers, fiberglass, carbon fiber, resins, such as epoxy resin, wood, other plant based materials, or any other material including combinations of materials that are substantially rigid.

The shaft body 31 may comprise one or more elongated shaft contact surfaces 34. In some embodiments, a shaft body 31 may comprise an elongated cylindrical shape generally having one cylindrically shaped shaft contact surface 34. In other embodiments, a shaft body 31 may comprise an elongated hexagonal prism shape having six generally planar shaft contact surfaces 34 thereby forming a hexagon shaped cross section. In preferred embodiments, a shaft body 31 may comprise any number of shaft contact surfaces 34 of any shape and size which may be configured to give the shaft body 31 an elongated triangular prism shape, an elongated rectangular prism shape, and elongated oval shape, or any other shape including combinations of shapes. For example, the majority and central portion of a shaft body 31 may comprise an elongated hexagonal prism shape, while each end 19, 21, of the shaft 12 may comprise a generally cylindrical shape.

In some embodiments, a shaft 12 may comprise one or more shaft keys 22 which may engage with one or more key channels 17 and lock grooves 18 within the cavity 16 of the outer housing 11. In preferred embodiments, a shaft key 22 may be chamfered or comprise rounded or beveled edges to facilitate the movement of the shaft key 22 into and out of the one or more key channels 17 and lock grooves 18. A shaft key 22 may be configured with any shape and size which may enable the shaft key 22 to be moved longitudinally within a key channel 17 and moved laterally or rotated into and out of a lock groove 18.

Figure 9:
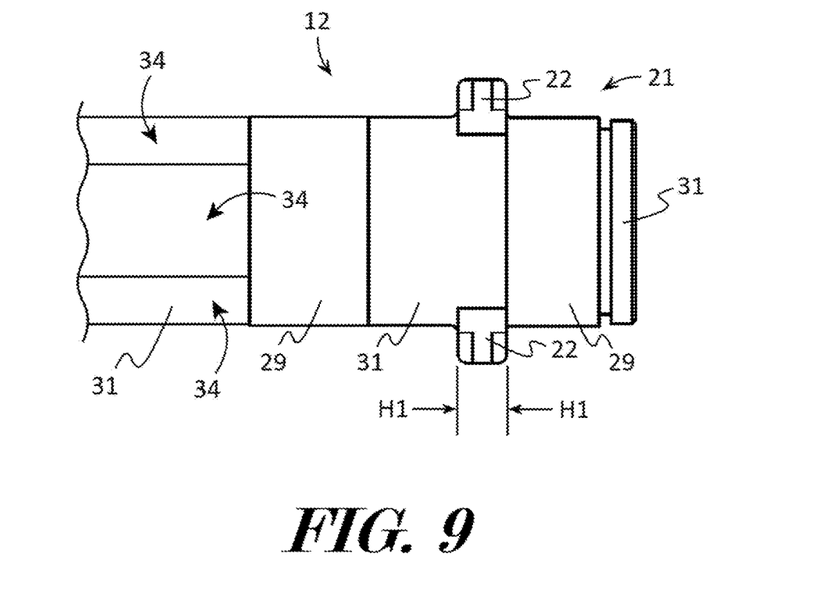
FIG. 9 shows a side elevation view of an example of a lower end of a shaft according to various embodiments described herein.
Figure 10:
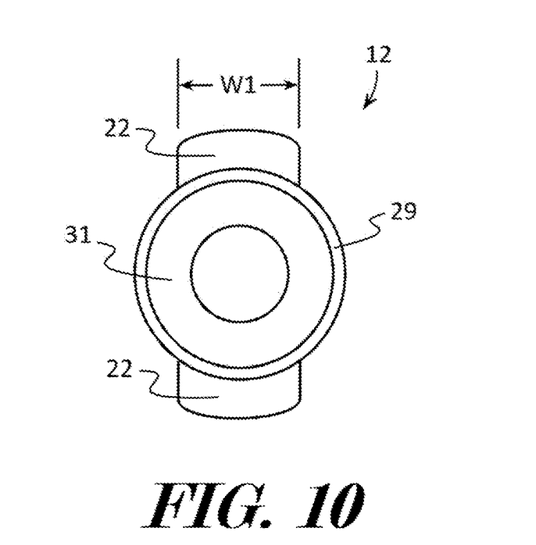
FIG. 10 depicts an end elevation view of an example of a lower end of a shaft according to various embodiments described herein.

In some embodiments, a shaft key 22 may comprise a generally rectangular prism shape having a width (W1) and a height (H1) as shown in FIGS. 9 and 10. In preferred embodiments, a shaft key 22 may comprise a W1 approximately equal to the width of a rail 27 so that the shaft key 22 may contact terminal portions of the rail 27 when the shaft key 22 is in a lock groove 18 so that the width of rail 27 may support the shaft key 22 to prevent the shaft 12 from extending or retracting. In further preferred embodiments, a shaft key 22 may comprise a W1 approximately equal to the width of a lock groove 18 so that approximately the entire W1 of the shaft key 22 may be moved longitudinally in the lock groove 18. In further preferred embodiments, a shaft key 22 may comprise a H1 approximately equal to, and preferably slightly smaller than, the height of a lock groove 18 so that the shaft key 22 may be prevented from wobbling or otherwise moving longitudinally while within the lock groove 18

In preferred embodiments, the device 100 may comprise two shaft keys 22, two key channels 17, two rails 27, and two or more lock grooves 18. The rails 27 may be opposingly positioned within the cavity 16 and each rail 27 may be separated by a key channel 17 and optionally one or more relief channels 33 so that the key channels 17 may also be opposingly positioned within the cavity 16. Each lock groove 18 may be opposingly positioned to another lock groove 18 within in the cavity 16. The opposingly positioned lock grooves 18 may be referred to as a set of lock grooves 18. The cavity 18 may comprise at least one, but preferably two, three, four, five, six, or more sets of lock grooves 18. The two shaft keys 22 may be coupled to or proximate to the lower end 21 of the shaft 12, and the shaft keys 22 may be opposingly positioned to each other. The lower end 21 of the shaft 12 may be positioned in the cavity 16 so that each shaft key 22 is positioned within a key channel 17 and/or within a lock groove 18. When the shaft keys 22 are each in a key channel 17, the shaft keys 22, and therefore portions of the shaft body 31, may be moved longitudinally within the cavity 16 so that portions of the shaft 12 may be extended or retracted into the cavity 16 of the outer housing 11. When the shaft keys 22 are laterally aligned with a set of lock grooves 18, the shaft keys 22 may be moved into the lock grooves 18 by rotating the shaft body 31. When all or portions of the shaft keys 22 are in the lock grooves 18, each shaft key 22, and therefore portions of the shaft body 31, may be prevented from being moved longitudinally by contacting the terminal ends of two adjacent longitudinal sections of a rail 27 that define the respective lock groove 18 so that portions of the shaft 12 may not be extended or retracted into the cavity 16 of the outer housing 11.

In alternative embodiments, the device 100 may comprise any number of shaft keys 22, key channels 17, rails 27, and lock grooves 18. In further alternative embodiments, the shaft keys 22, key channels 17, rails 27, and lock grooves 18 may not be opposingly positioned relative to each other but may be staggered along the length of the cavity 16 and shaft body 31 but positioned so that the shaft keys 22 may be rotated into and out of the lock grooves 18 and also longitudinal moved in the key channels 17. In still further alternative embodiments, one or more shaft keys 22 may be coupled to the side wall 13 within the cavity 16 and one or more key channels 17, rails 27, and lock grooves 18 may be formed into or coupled to the shaft body 31.

In some embodiments, the device 100 may comprise one or more bushings 29 which may facilitate the longitudinal movement and/or the lateral or rotational movement of the lower end 21 of the shaft 12 within the cavity 16 preferably by decreasing friction between an element of the outer housing 11 and an element of the shaft 12. In some embodiments, a bushing 29 may simply comprise an independent plain bearing which may be made from low friction metals or low friction plastics, such as polytetrafluoroethylene (PTFE), polyethylene terephthalate (PET), high-density polyethylene (HDPE), polyvinyl chloride (PVC), polypropylene (PP), etc., that is disposed in the cavity 16 to provide a bearing surface for decreasing friction between an element of the outer housing 11 and an element of the shaft 12. In other embodiments, a bushing 29 may comprise a ball bearing or any other type of rolling-element bearing.

In some embodiments, the device 100 may comprise a collar 32 which may be gripped or otherwise manipulated by a user so that by rotating the collar 32, the shaft body 31 may also be rotated. In further embodiments, a collar 32 may be rotatably coupled to the first end 14 of the side wall 13 of the outer housing 11, such as with a threaded engagement or coupling method. For example, portions of the side wall 13 proximate to the first end 14 may comprise threading 49 which may be engaged to complementary threading 49 on the collar 32. In some embodiments, the collar 32 may block or prevent a shaft key 22 from exiting a key channel 17, and therefore prevent the lower end 21 of the shaft 12 from being separated from the outer housing 11, through the first end 13. In other embodiments, a pin, such as a roll pin, a fastener, such as a set screw, or other object may be disposed in the key channel 17 to block or prevent a shaft key 22 from exiting a key channel 17, and therefore prevent the lower end 21 of the shaft 12 from being separated from the outer housing 11, through the first end 13.

The collar 32 may comprise a collar aperture 35, and the collar aperture 35 may slidably receive portions of the shaft body 31 so that the shaft body 31 may be longitudinally moved into and out of the collar aperture 35. In preferred embodiments, the collar 32 may be rotationally coupled with the shaft 12 so that rotation of one causes rotation of the other. In further preferred embodiments, the shaft body 31 may comprise one or more shaft contact surfaces 34 which may be moved longitudinally across one or more collar contact surfaces 36 of the collar 32. The shaft contact surfaces 34 may be complementary in cross sectional shape to the collar contact surfaces 36 so that by rotating one contact surface 34, 36, the other contact surfaces 34, 36, may likewise be rotated. Preferably, the shaft contact surfaces 34 and collar contact surfaces 36 may rotationally couple the shaft 12 with the collar 32 while allowing the shaft 12 to be moved longitudinally relative to the collar 32.

In some embodiments, the shaft body 31 may comprise six shaft contact surfaces 34 generally oriented to give portions of the shaft body 31 a generally hexagon shaped cross sectional shape, and the collar aperture 35 may comprise six collar contact surfaces 36 generally oriented to give the collar aperture 35 a generally hexagon shaped cross sectional shape which may be slightly larger than the hexagon shaped cross sectional shape of the shaft body 31 so that the shaft contact surfaces 34 and collar contact surfaces 36 may longitudinally slide against each other while preventing the collar 32 and shaft 12 from being rotated or moved laterally relative to each other. In other embodiments, the shaft body 31 may comprise four shaft contact surfaces 34 generally oriented to give portions of the shaft body 31 a generally rectangular shaped cross sectional shape, and the collar aperture 35 may comprise four collar contact surfaces 36 generally oriented to give the collar aperture 35 a generally rectangular shaped cross sectional shape which may be slightly larger than the rectangular shaped cross sectional shape of the shaft body 31 so that the shaft contact surfaces 34 and collar contact surfaces 36 may longitudinally slide against each other while preventing the collar 32 and shaft 12 from being rotated or moved laterally relative to each other. In still other embodiments, one or more shaft contact surfaces 34 and collar contact surfaces 36 may be configured with any other complementary shapes, such as projections, depressions, etc., which may longitudinally slide against each other while preventing the collar 32 and shaft 12 from being rotated or moved laterally relative to each other.

In some embodiments, the device 100 may comprise one or more ball plungers 37 and one or more indexing detents 38. A ball plunger 37 and indexing detent 38 may form a ball detent arrangement commonly having a ball sliding within a bored cylinder (forming the ball plunger 37), against the pressure of a spring, which pushes the ball against the other part of the device 100, which carries the indexing detent 38 that can be as simple as a hole of depression of smaller diameter than the ball. When the indexing detent 38 is in line with the cylinder, the ball of the ball plunger 37 may fall partially into or otherwise engage the indexing detent 38 under spring pressure, which may be felt by the user, at that position. Additional force applied to move the shaft 12 relative to the collar 32 will push the ball back into its cylinder, compressing the spring, and as the shaft 12 is moved to another position relative to the collar 32. The ball plunger(s) 37 and indexing detent(s) 38 may be positioned so that the ball plunger 37 may engage with an indexing detent 38 when a shaft key 22 is aligned with a lock groove 18. In this manner, the engagement between the ball plunger 37 and an indexing detent 38 may indicate to the user that the shaft key 22 is aligned with a lock groove 18 and therefore the shaft key 22 may be rotated into the lock groove 18.

In some embodiments, a collar 32 may comprise a ball plunger 37 and the shaft body 31 may comprise one or more indexing detents 38, such as one indexing detent 38 for every lock groove 18 or set of lock grooves 18. In further embodiments, the collar 32 may comprise an indexing detent 38 and the shaft 12 may comprise one or more ball plungers 37, such as one ball plunger 37 for every lock groove 18 or set of lock grooves 18.

In some embodiments, the device 100 may comprise a ring 39 which may be coupled to the outer housing 11 proximate to the first end 14 and to the collar 32. In some embodiments, a ring 39 may comprise threading 49 which may be engaged to threading 49 on portions of the side wall 13. Optionally, the collar 32 may also be engaged to the threading 49 on the side wall 13 proximate to the first end 14. Preferably, the ring 39 which may be coupled to the outer housing 11 so that rotation of the ring 39 relative to the outer housing 11 may be prevented, governed, or selectively prevented. For example, a set screw or other fastener may be inserted through portions of the ring 39 to contact the side wall 13 to selectively prevent rotation of the ring 39. As another example, ring 39 may be coupled to the outer housing 11 with adhesive, heat bonding or welding, fasteners, such as rivets, or with any other coupling method.

In some embodiments, the device 100 may comprise one or more guide teeth 41 which may engage with one or more guide depressions 42. Generally, a guide tooth 41 may extend into and be movable within a guide depression 42, while the guide depression 42 may be shaped to limit the movement of the guide tooth 41 to a first direction and an opposite second direction. For example, an arc shaped guide depression 42 may limit the movement of the guide tooth 41 to a clockwise direction and a counter clockwise direction generally limited to the length of the arc shape of the guide depression 42. The engagement between a guide tooth 41 and a guide depression 42 may be used to limit the movement of the shaft 12 and/or collar 32 relative to the outer housing 11. In some embodiments, a ring 39 may comprise a guide tooth 41 and a collar 32 may comprise a guide depression 42. In further embodiments, a collar 32 may comprise a guide tooth 41 and a ring 39 may comprise a guide depression 42. Preferably, a ring 39 may comprise a guide tooth 41 and a collar 32 may comprise a guide depression 42, and the guide tooth 41 may be movable within the guide depression 42 to limit the rotation of the collar, and therefore the shaft 12, relative to the ring 39, and therefore the outer housing 11.

Figure 11:
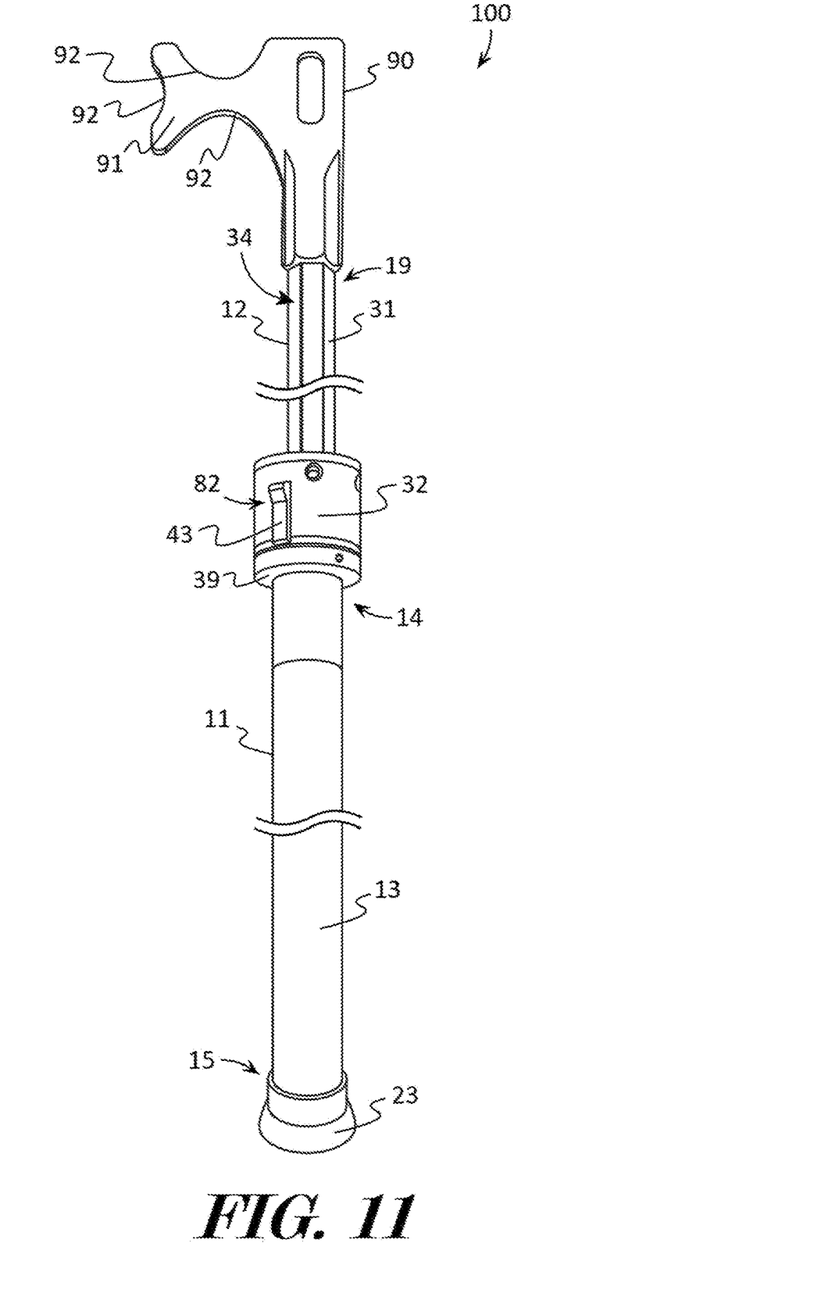
FIG. 11 illustrates a perspective view of an example of a telescoping handle device having a lever in a second position according to various embodiments described herein.

In some embodiments, the device 100 may comprise a lever 43 which may be moved longitudinally to prevent or enable rotation of the shaft 12, optionally by preventing rotation of a collar 32, relative to the outer housing 11. In preferred embodiments, a lever 43 may be slidably coupled to the collar 32, such as by being slidably positioned within a collar notch 44, and portions of the lever 43 may be moved into engagement with a ring 39 to prevent rotation of the collar 32 and shaft 12 and moved out of engagement with the ring 39 to enable rotation of the collar 32 and shaft 12. In further preferred embodiments, the lever 43 may be movable into a first position 81 (FIG. 1) in which the lever 43 is engaged with the ring 39 to prevent rotation of the collar 32 and shaft 12, and the lever 43 may be movable into a second position 82 (FIG. 11) in which the lever 43 is not engaged to the ring 39 to allow rotation of the collar 32 and shaft 12.

In some embodiments, a lever 43 may comprise a lever body 45 and a lever pin 46. Portions of the lever pin 46 may be slidably received in a lever pin aperture 47. A spring 48, such as a coil spring, may tension the lever body 45 and/or lever pin 46 away from the lever pin aperture 47 and into contact with the ring 39. In some embodiments, a ring 39 may comprise a ring aperture 51 which may be shaped to receive portions of the lever pin 46 that are distal to the lever pin aperture 47. By receiving a greater portion of the lever pin 46 when the lever 43 is in the first position 81, as preferably motivated by the spring 48, the received portion of the lever pin 46 in the ring aperture 51 may engage the lever 43 to the ring to prevent rotation of the collar 32 and shaft 12. When the lever 43 is in the second position 82, the lever pin 46 may slide across a surface of the ring 39 so that the lever 43 is not engaged to the ring 39 thereby allowing rotation of the collar 32 and shaft 12.

In alternative embodiments, a lever 43 may be slidably coupled to a ring 39 and the lever 43 may be moved into engagement with a collar 32 to prevent rotation of the collar 32 and shaft 12 and moved out of engagement with the collar 32 to enable rotation of the collar 32 and shaft 12. A lever 43 may be configured in any shape and size and configured to be moved in any direction or manner to be engaged and moved in any other direction to be disengaged from another element of the device 100 to prevent rotation of the collar 32 and shaft 12 and to enable rotation of the collar 32 and shaft 12, respectively.

In some embodiments, a ring 39 may comprise a ring depression 52 having a depth that is relatively lesser than the depth of a ring aperture 51 so that only a small portion of the lever pin 46 may be received in the ring depression 52. In this manner, engagement of a lever pin 46 with a ring depression 52 may be used as an indicator. For example, a ring depression 52 may engage the lever pin 46 to provide tactile feedback to indicate that shaft 12 is unlocked (extendable and retractable) with the shaft key(s) 22 disposed in the key channel(s) 17.

In some embodiments, the device 100 may comprise a tool head 90 which may be coupled to the upper end 19 of the shaft 12. A tool head 90 may be configured in any size and shape to enable the tool head 90 to be manipulated by a user to perform one or more functions. In some embodiments, a tool head 90 may comprise a hook 91 having a hook indentation 92. A hook 91 may comprise a projection from the tool head 90, of any shape and size, which may be used to grapple, hook, or otherwise manipulate objects such handbrakes on railroad cars. A hook indention 92 may comprise a depression, indentation, or the like which may receive portions of objects such handbrakes on railroad cars. In further embodiments, a tool head 90 may be configured with any type of hook 91 and hook indentation 92, such as shown in U.S. Pat. No. 5,481,950. A tool head 90 may be coupled to the upper end 19 of the shaft 12 with any suitable coupling method, such as by threading and gluing it in place, and inserting a roll pin horizontally through the shaft body 31 and tool head 90 to prevent the tool head 90 from coming unscrewed.

In some embodiments, one or more surfaces of one or more elements of the device 100, such as the outer housing 11, collar 32, ring 39, and shaft 12, may comprise a grip enhancing texture. For example, one or more surfaces of one or more elements of the device 100 may comprise a knurled pattern, stippling, diamond patterning, or any other grip enhancing surface treatment.

While some materials have been provided, in other embodiments, the elements that comprise the device 100, such as the outer housing 11, shaft 12, collar 32, optional ring 39, optional tool head 90, and/or any other element discussed herein may be made from durable materials such as aluminum, steel, other metals and metal alloys, wood, hard rubbers, hard plastics, fiber reinforced plastics, carbon fiber, fiber glass, resins, polymers or any other suitable materials including combinations of materials. Additionally, one or more elements may be made from or comprise durable and slightly flexible materials such as soft plastics, silicone, soft rubbers, or any other suitable materials including combinations of materials. In some embodiments, one or more of the elements that comprise the device 100 may be coupled or connected together with heat bonding, chemical bonding, adhesives, clasp type fasteners, clip type fasteners, rivet type fasteners, threaded type fasteners, other types of fasteners, or any other suitable joining method. In other embodiments, one or more of the elements that comprise the device 100 may be coupled or removably connected by being press fit or snap fit together, by one or more fasteners such as hook and loop type or Velcro® fasteners, magnetic type fasteners, threaded type fasteners, sealable tongue and groove fasteners, snap fasteners, clip type fasteners, clasp type fasteners, ratchet type fasteners, a push-to-lock type connection method, a turn-to-lock type connection method, a slide-to-lock type connection method or any other suitable temporary connection method as one reasonably skilled in the art could envision to serve the same function. In further embodiments, one or more of the elements that comprise the device 100 may be coupled by being one of connected to and integrally formed with another element of the device 100.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A telescoping handle device, the device comprising:
an outer housing having an elongated side wall, the side wall terminating in a first end and a second end;
a cavity formed within the side wall, the cavity comprising a key channel and a lock groove;
a shaft movable within the cavity, the shaft having an upper end and a lower end; and
a shaft key coupled to the shaft, the shaft key slidably engaged within the key channel so that the shaft key is slidable between the first end and the second end, wherein the shaft key is rotatable out of the key channel and into the lock groove to prevent the shaft key from being slidable between the first end and the second end.

2. The device of claim 1, wherein the key channel is orientated generally parallel with the first end and the second end.

3. The device of claim 1, wherein the lock groove is orientated generally perpendicular to the key channel.

4. The device of claim 1, wherein the device comprises a ball plunger which is configured to engage with an indexing detent, and wherein the ball plunger engages with the indexing detent when the shaft key is aligned with the lock groove.

5. The device of claim 1, wherein the device comprises a guide tooth and a guide depression, and wherein the guide tooth is movable within the guide depression to limit the rotation of the shaft.

6. The device of claim 1, further comprising a collar rotatably coupled to the first end of the outer housing, the collar having a collar aperture for slidably receiving the shaft, wherein the collar is rotationally coupled with the shaft.

7. The device of claim 6, wherein the shaft comprises a shaft contact surface and the collar comprises a collar contact surface, and wherein the shaft contact surface and collar contact surface rotationally couple the shaft with the collar.

8. The device of claim 7, wherein the shaft comprises six shaft contact surfaces and the collar comprises six collar contact surfaces.

9. The device of claim 1, further comprising a ring coupled to the first end of the side wall and comprising a lever coupled to a collar, the collar rotatably coupled to the outer housing, wherein the lever is movable into a first position in which the lever is engaged with the ring to prevent rotation of the collar, and wherein the lever is movable into a second position in which the lever is not engaged to the ring to allow rotation of the collar.

10. The device of claim 9, wherein the ring comprises a guide tooth and the collar comprises a guide depression, and wherein the guide tooth is movable within the guide depression to limit the rotation of the collar relative to the ring.

11. A telescoping handle device, the device comprising:
an outer housing having an elongated side wall, the side wall terminating in a first end and a second end;
a cavity formed within the side wall, the cavity comprising a key channel and a lock groove;
a shaft movable within the cavity, the shaft having an upper end and a lower end;
a shaft key coupled to the shaft, the shaft key slidably engaged within the key channel so that the shaft key is slidable between the first end and the second end, wherein the shaft key is rotatable out of the key channel and into the lock groove to prevent the shaft key from being slidable between the first end and the second end; and
a collar rotatably coupled to the first end of the outer housing, the collar having a collar aperture for slidably receiving the shaft, wherein the collar is rotationally coupled with the shaft.

12. The device of claim 11, wherein the key channel is orientated generally parallel with the first end and the second end.

13. The device of claim 11, wherein the lock groove is orientated generally perpendicular to the key channel.

14. The device of claim 11, wherein the device comprises a ball plunger which is configured to engage with an indexing detent, and wherein the ball plunger engages with the indexing detent when the shaft key is aligned with the lock groove.

15. The device of claim 11, wherein the device comprises a guide tooth and a guide depression, and wherein the guide tooth is movable within the guide depression to limit the rotation of the shaft.

16. The device of claim 11, wherein the shaft comprises a shaft contact surface and the collar comprises a collar contact surface, and wherein the shaft contact surface and collar contact surface rotationally couple the shaft with the collar.

17. The device of claim 16, wherein the shaft comprises six shaft contact surfaces and the collar comprises six collar contact surfaces.

18. The device of claim 11, further comprising a ring coupled to the first end of the side wall and comprising a lever coupled to a collar, the collar rotatably coupled to the outer housing, wherein the lever is movable into a first position in which the lever is engaged with the ring to prevent rotation of the collar, and wherein the lever is movable into a second position in which the lever is not engaged to the ring to allow rotation of the collar.

19. The device of claim 18, wherein the ring comprises a guide tooth and the collar comprises a guide depression, and wherein the guide tooth is movable within the guide depression to limit the rotation of the collar relative to the ring.

20. The device of claim 11, further comprising a tool head coupled to the upper end of the shaft, the tool head comprising a hook having a hook indentation.

\* \* \* \* \*